Jan. 6, 1959 J. BRUECKER 2,867,038
ELECTRICALLY OPERATED SHAVER WITH ROTARY
SELF-ADJUSTING CUTTING BLADES
Filed Nov. 9, 1956 5 Sheets-Sheet 1
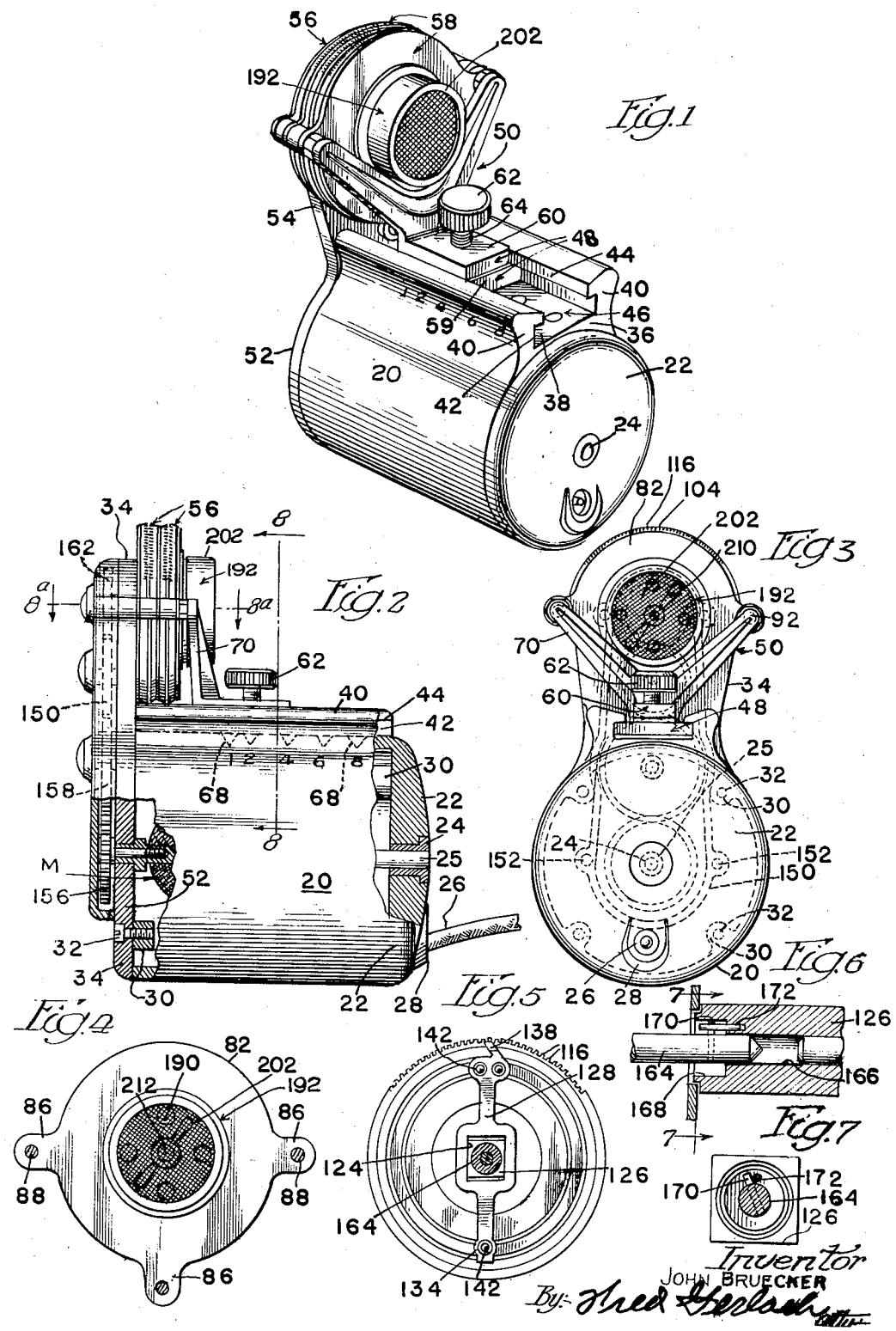
Inventor
JOHN BRUECKER

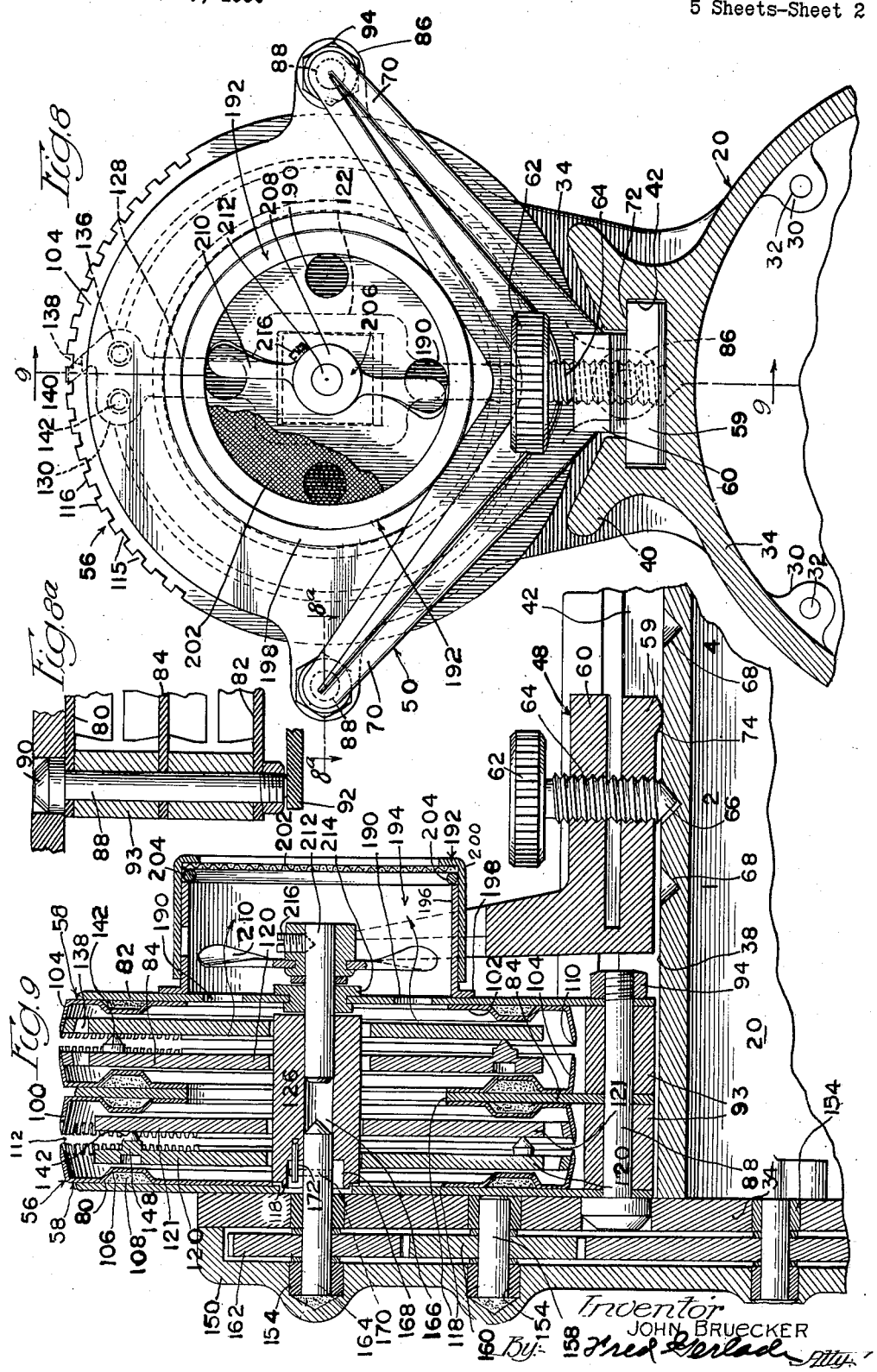

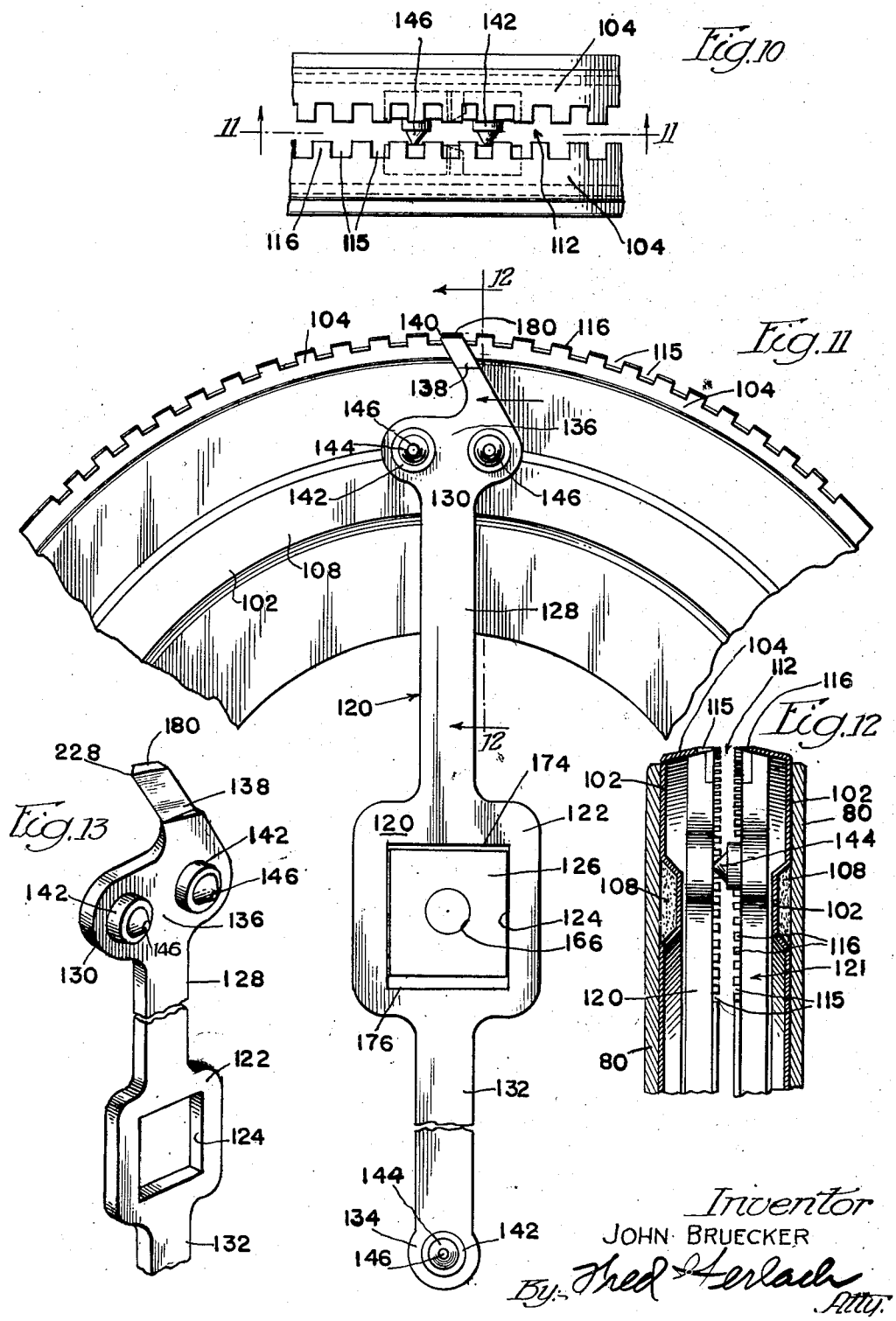

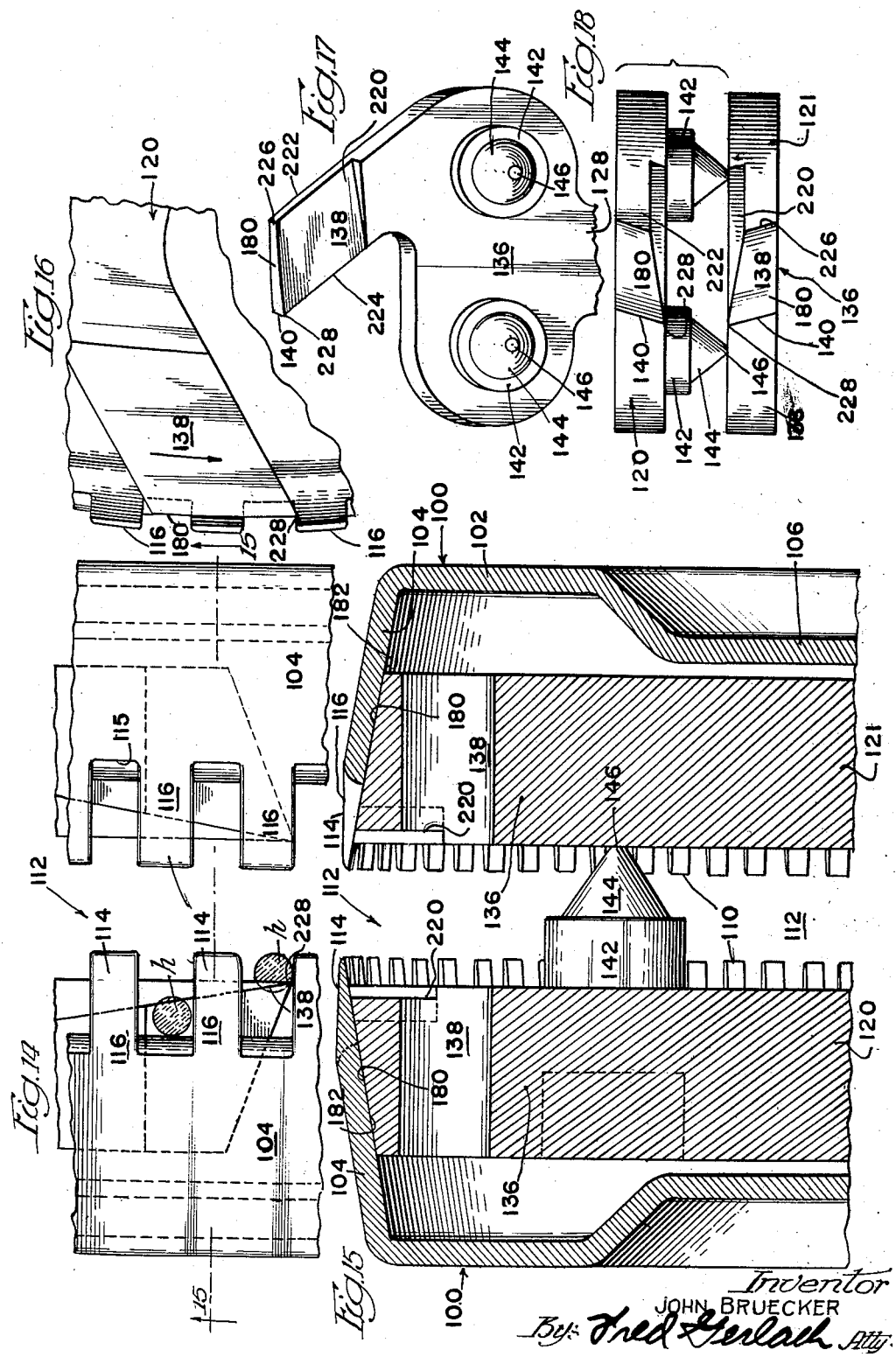

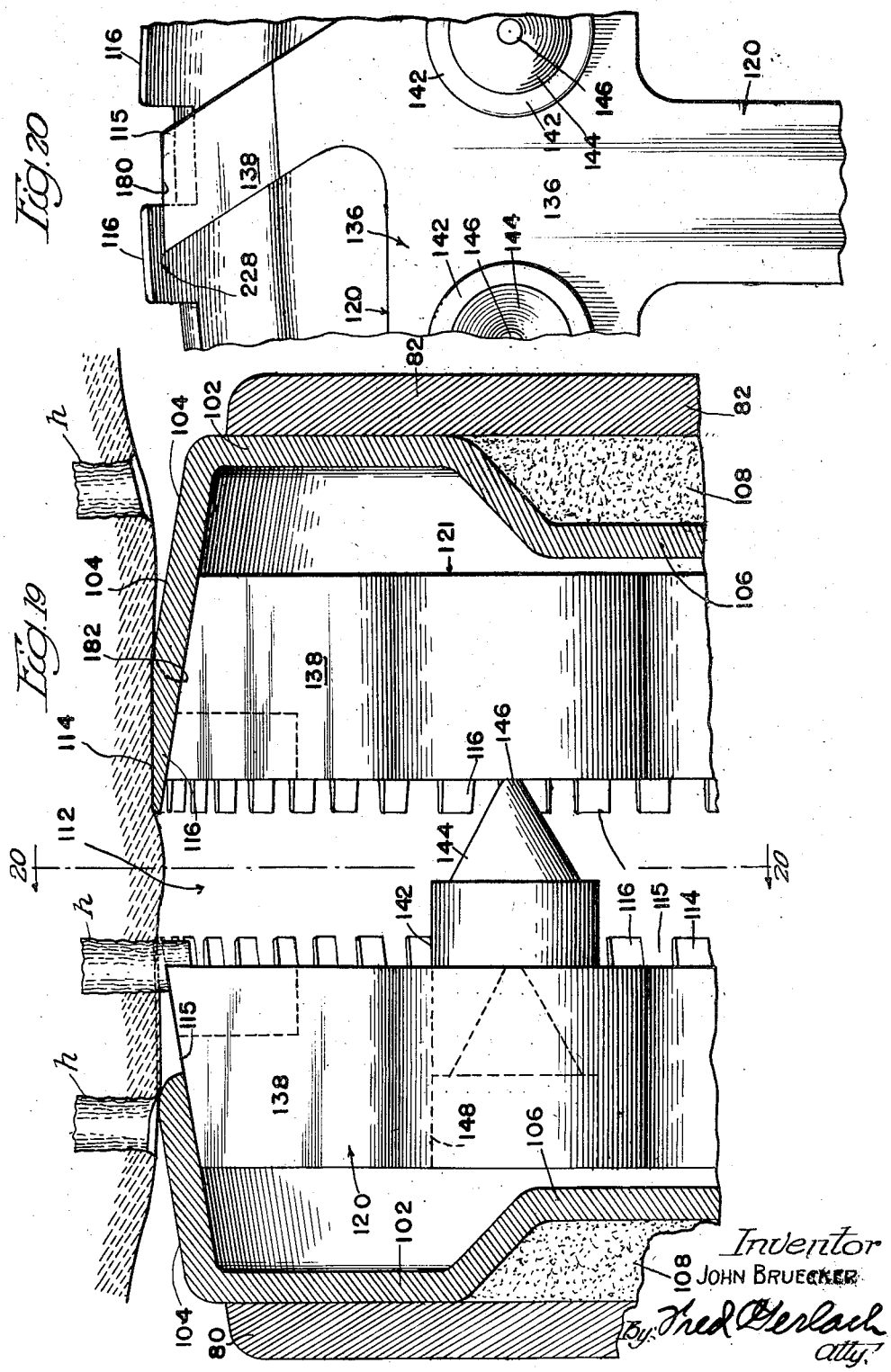

2,867,038
ELECTRICALLY OPERATED SHAVER WITH ROTARY SELF-ADJUSTING CUTTING BLADES

John Bruecker, Glendale, Calif.

Application November 9, 1956, Serial No. 621,352

33 Claims. (Cl. 30—41.5)

The improved electric shaver comprising the present invention has been designed for use primarily in connection with the removal of face hair or beard growth on or in the vicinity of the face of the user. The invention is, however, capable of other uses and the same may readily, with or without modification, be adapted for other depilatory use as, for example, in the removal of hair from the arms, legs or other portions of the human body.

Specifically, the present invention relates to shavers of the internal rotary cutter type as distinguished from those shavers which employ internal cutter elements which oscillate in an arcuate path or reciprocate in a linear path across the inner surfaces of a series of fixed cooperating exterior cutting teeth provided on an external shell or casing structure. More specifically, the invention is concerned with an electric shaver having a unidirectional rotary cutting element including a cutting head which moves in a circular path about a horizontal axis when the shaver is upright and which, in so moving, makes successive or repeated peripheral sweeping movements across the inside or concave arcuate toothed cutting area of an outer encompassing shell or casing structure with the cutting edge of the element bearing radially outwardly against such tooth cutting area. The present shaver is thus to be distinguished from that class of unidirectional rotary shavers wherein the cutting head moves in a radial plane and is provided with radial teeth which sweep across a toothed annulus and effect their cutting action at different radial distances from the axis of rotation of the cutter element and consequently at different cutting speeds.

Briefly, the present invention contemplates the provision of a shaver of novel design including a generally cylindrical motor casing containing therein the driving motor for the various moving cutter elements and having associated therewith means whereby a shaver head assembly consisting of a single cutting head unit or of plural cutting head units may selectively be applied to the casing in operative driven relationship with respect to the driving motor, the substitution of shaving head assemblies being readily made by manipulation of a single clamping screw. The clamping screw is designed for cooperation with selected surfaces on the casing whereby, regardless of the number of serially arranged cutting head units embodied in the shaving head assembly, each assembly will, upon tightening of the clamping screw, be drawn firmly toward its operative installed position and, furthermore, securely locked in position against dislodgment. The electric motor substantially fills the motor casing and the latter, which serves as an operating handle or grip for manipulation of the shaver during shaving operations, may thus be made of relatively small size since it does not enclose any of the operating cutting instrumentalities associated with the shaver. Furthermore, the interior of the motor casing is separate from the interior of the shaving head assembly and is sealed against infiltration of severed hairs or so-called "cutter dust" as well as being sealed from atmospheric infiltration.

The various shaver head assemblies are adapted to be pre-assembled at the factory and they may be regarded as conversion or replacement units capable of installation by the individual consumers. Thus, in a household where a particular individual has an aversion to use of another person's shaving equipment, separate shaving heads may be maintained for use by different individuals with the same casing. This feature of the invention is significant where both masculine and feminine use of the shaver is contemplated, since a single cutter head is generally preferred by women whereas multi-head units are the masculine preference, if not the necessity. It is also significant where the shaver is used professionally inasmuch as it is a comparatively easy matter for the barber or other user to maintain a number of the heads in a sterilizing cabinet or bath for substitution in the shaver assembly after individual use. To facilitate such substitution of shaver heads, the electric motor associated with the motor casing is operatively connected to a drive shaft and the latter is provided with means whereby it may be releasably coupled to the various shaver head assemblies, whether the same be comprised of a single cutting head unit or plural units, such coupling or uncoupling taking place automatically when a selected assembly is mounted on the motor casing and secured in position thereon by the above mentioned clamping screw.

Where multi-head units are employed in the shaving head, the units are arranged in tandem but in close relationship so as to consume but little space. Each unit is of cylindrical barrel-shape configuration and comprises two opposed cup-shaped shell-like casing structures formed of thin gauge steel presenting frusto-conical outer walls the rims of which are maintained spaced from each other a slight distance to provide a medial slot extending around the medial regions of the composite two-part casing. Throughout a limited arcuate extent of the slot, the rim portions of the casing sections are slotted to provide on the two sections a series of opposed but spaced staggered cutting teeth, the outer surfaces of the teeth being flattened for conformity to the skin of the user. The head is adapted to be positioned against the skin of the user so that the flattened portions of the teeth engage the skin and so that the protruding hairs may extend into the casing through the arcuate slot, after which lateral sliding movement of the head along the surface of the skin in one direction or another, for example, in a circular path, will cause the hairs to be encompassed within the tooth interstices and subsequently severed by the cutting action of a unidirectional rotating cutter element, one of which is disposed within and cooperates with each toothed casing shell.

The two cutter elements associated with each cutter head are in the form of elongated narrow bars which are mounted on a central rotating shaft assembly and are each longitudinally aligned with the toothed area on the outer conical side of the cup-shaped casing shell within which the cutter element is mounted. Each cutter element carries at its outer end a cutting head including a cutting edge which, upon rotation of the element, repeatedly sweeps the inner surface of the toothed area of the casing shell so as to sever such protruding hairs as may enter the interstices between the adjacent cutting teeth on the casing shell. The cutter elements are floatingly mounted on the central rotating shaft assembly and the action of centrifugal force is relied upon to maintain the necessary outward cutting pressure of the cutting head upon the cutting teeth so that the use of springs to create such pressure or the reliance upon the yielding spring action of the cutter teeth on the casing may be dispensed with. Additionally, the arrangement of the cutting teeth on the casing and the floating disposition of the cutter elements on the driving shaft is such that during rotation of the cutter elements, the outward thrust upon the cutter elements under the influence of centrifugal force will cause the cutter elements to have a camming action, each independently of the other, against the cutting teeth on the casing tending to force the floating cutter elements toward each other and into contact whereby the two cutter elements are maintained properly spaced from each other in their essential relationship of parallelism and properly aligned with the arcuate rows of cutting teeth with which the elements respectively cooperate.

The above outlined features of the invention constitute in a large measure the novelty associated with the same and an additional and important feature of the invention resides in the specific design of the cutter blade proper associated with each cutting element. These cutter blades are carried at the outer ends of the respective cutter elements and each blade is formed with a linear cutting edge which is disposed at a slight angle with respect to the axial extent of the cutting edge of each cutting tooth on the casing shell so that as the cutting edge of the cutter blade approaches any given cutting edge on a cutting tooth, any protruding hair growth which may find itself in the path of movement of the cutter blade will be entrapped between the two relatively inclined cutting edges and, if not initially in a position for complete severing, will be drawn inwardly of the particular interstice in the vicinity thereof and placed in a position where a more effective and complete severance is made possible.

The provision of an electric shaver of the character briefly outlined above being among the principal objects of the invention, it is an additional object to provide a novel means for creating a partial vacuum within the shaving head assembly and for utilizing such partial vacuum to draw air through the assembly whereby any entrained severed hairs or "cutter dust" may be continuously withdrawn from the interior of the shaver head casing and deposited in a removable receptacle.

The provision of an electric shaver which is relatively simple in its construction and which therefore may be manufactured at a comparatively low cost; one which is comprised of a minimum number of moving parts and which therefore is unlikely to get out of order; one which is rugged and durable and which may therefore be subjected to rough usage without danger of damage thereto; one in which the various opposed cutting edges thereof are self-aligning; one in which all of said cutting edges are self-sharpening during use; one which is smooth and silent in its operation and which is free from excessive vibration so that it is possessed of a long life; one which is rapid and efficient in its cutting action; one which is pleasing in its appearance and attractive in its design; one which may readily be assembled and disassembled for purposes of inspection, replacement, repair or sterilization of the cutter head assembly thereof, and one which is otherwise well adapted to perform the services required of it, are further desirable features which have been borne in mind in the production and development of the present invention.

Numerous other objects and advantages of the invention, not at this time enumerated, will become more readily apparent as the nature of the invention is better understood.

In the accompanying five sheets of drawings forming a part of this specification a preferred embodiment of the invention has been shown.

In these drawings:

Figure 1 is a rear perspective view of an electric shaver constructed in accordance with the principles of the present invention;

Figure 2 is a side elevational view of the shaver with certain parts broken away to more clearly reveal the nature of the invention;

Figure 3 is an end elevational view of the structure shown in Figure 2;

Figure 4 is a rear end view of a shaving head assembly employed in connection with the present shaver;

Figure 5 is a transverse sectional view taken through the shaving head of Figure 4 in the vicinity of one of the cutting elements thereof;

Figure 6 is a fragmentary detail sectional view taken longitudinally through a driving shaft assembly employed in connection with the invention;

Figure 7 is a sectional view taken substantially along the line 7—7 of Figure 6;

Figure 8 is an enlarged fragmentary sectional view taken substantially along the line 8—8 of Figure 2;

Figure 8a is a sectional view taken substantially along the line 8a—8a of Figure 8;

Figure 9 is a sectional view taken substantially along the line 9—9 of Figure 8;

Figure 10 is a fragmentary plan view of a portion of one of the cutting heads of the present shaver in the vicinity of the cutting teeth thereof;

Figure 11 is a sectional view taken substantially along the line 11—11 of Figure 10;

Figure 12 is a fragmentary sectional view taken substantially along the line 12—12 of Figure 11;

Figure 13 is a fragmentary perspective view of one of the cutting elements employed in connection with the invention;

Figure 14 is an enlarged detail plan view of a fragment of a shaver head unit in the vicinity of the cutting teeth thereof and diagrammatically illustrating the operation thereof in connection with the severing of human hair;

Figure 15 is a sectional view taken substantially along the line 15—15 of Figure 14;

Figure 16 is a side elevational view of the structure shown in Figure 15;

Figure 17 is a fragmentary detail view of a cutting blade head associated with one of the cutting elements of the present shaver;

Figure 18 is a fragmentary view looking radially inwardly at the ends of a pair of cooperating cutting elements associated with one of the shaving head units of the shaver;

Figure 19 is a fragmentary sectional view taken transversely through a peripheral region of one of the cutting head units and diagrammatically illustrating the operation thereof in connection with the severing of human hair; and Figure 20 is a sectional view taken substantially along the line 20—20 of Figure 19.

In all of the above described views, similar characters of reference are employed to designate similar parts throughout.

Referring now to the drawings in detail and in particular to Figs. 1, 2 and 3, briefly, the improved shaver of the present invention involves in its general organization a relatively deep cup-shaped casing 20 which is closed at one end by a relatively thick integral end wall 22 having a centrally disposed bushing insert 24 therein which constitutes a bearing for one end of the armature shaft 25 of an electric motor M, the details of which have not been illustrated herein but which may be of any suitable type. The casing 20 is preferably formed of molded thermosetting plastic material since such material possesses adequate strength for the purposes intended, is electrically insulating, and may be compounded in a variety of colors which present an attractive appearance to the finished molded article. The casing 20 is formed with a series of longitudinally extending internal ribs 30 which at the open end or rim of the casing, may be drilled and threaded for reception therein of clamping screws 32 by means of which a combined closure and backing plate 34 may be clamped in position over the open end of the casing. The nature and function of the backing plate 34 will be set forth presently.

The casing 20 has formed on the upper side thereof, as viewed in Fig. 1, a thickened region 36 providing a flat land area 38 from the opposite sides of which there extends upwardly a pair of ribs 40 which extend longitudinally of the casing 20 and which are substantially coextensive therewith. The ribs 40 are undercut internally to provide a pair of guide channels 42 which, in combination with the inner faces 44 of the ribs, provide, in effect, an inverted open-ended T-shaped slot or guideway 46 in which there is disposed the base portion 48 of a clamping yoke assembly 50, the nature and function of which also will be made clear presently.

The backing plate 34 may be formed of plastic material or of metal, for example, aluminum for the sake of lightness, and is in the form of a flat plate of lobe-shape design, it having a generally figure 8 contour including a lower lobe portion 52 which closes the open end or rim of the casing 20 and an upper lobe portion 54 which projects upwardly above the top of the casing 20 and constitutes a backing or retaining wall which cooperates with the yoke assembly 50 in releasably clamping therebetween a shaving head assembly 56 consisting of one or more cutting head units 58, two such units being shown herein for illustrative purposes. The shaving head assemblies 56 are adapted to be assembled at the factory in different sizes, which is to say that they may be constructed with a single head or with multiple heads, preferably in multiples of two. The casing herein illustrated is designed to accommodate shaving head assemblies having one, two, four or six head units but it will be understood that if desired the length of the casing, or at least of the T-shaped slot 46, may be extended to accommodate ensembles having eight or more cutting head units 58, because of the fact that the cutting head assemblies are readily removable from the motor casing and backing plate.

The clamping yoke assembly 50 includes the previously mentioned base portion 48 which, as best seen in Figs. 8 and 9, is in the form of a horizontally split block including a lower section 59 of generally rectangular design, the side edges of which are confined within the undercut guide channels 42. The block further includes an upper section 60 of lesser width than the lower section so that it may fit snugly between the opposed inner faces 44 of the ribs 40. A clamping screw having a knurled head 62 and a threaded shank 64 is threadedly received in and projects completely through both sections 59 and 60 and the lower end of the shank 64 is pointed or tapered as at 66 and is designed for selective cooperation with a series of conical recesses or sockets 68 (Fig. 9) provided in the land portion 38 of the casing 20 to clamp the block 48, and consequently the yoke assembly 50 in certain selected positions of adjustment along the casing. The various cutting head units 58 are identical in construction and, since the units are precision built, the longitudinal extent of the assembled multiple-unit shaving head is a numerical dimensional multiple of the width of a single unit. Thus it is possible to ascertain a longitudinal position for each of the recesses 68 wherein the axis of the clamping screw is slightly rearwardly offset from the vertical axis of the recess when a shaving head assembly having an even number of heads is mounted on the casing 20. By this expedient, and by the further expedient of forming the lower end of the clamping screw with a pointed or conical surface and each recess with a conical bottom, the clamping screw and one of the recesses 68 may be brought into partial register when a particular multi-head assembly 56 is mounted on the casing so that the conical surface 66 of the screw has camming engagement with one side of the recess bottom and tends to draw the yoke assembly 50 toward the backing wall 54 to firmly clamp the shaving head assembly in its operative position against the wall, all in a manner which will become clear as the following description ensues.

The clamping effect of the clamping yoke 50 is distributed against the rearmost head unit 58 at spaced regions through the medium of a pair of diverging yoke arms 70 which project upwardly at the rear of the yoke base 48 and which contact the unit 58 at their outer ends. Thus it will be seen that as the shank 64 of the clamping screw is turned in a direction to tighten the clamping screw, lower end of the shank 62 will be biased forwardly, i. e., to the left as viewed in Fig. 9 while at the same time the side regions of the lower portion 59 of the block 48 will be drawn upwardly in the guideways 42 and firmly clamped against the overhanging ledge portions 72 associated with the same. Additionally, because of the reaction force offered to the yoke assembly 50 by the head assembly 56, the yoke arms 70 and the upper portion 60 of the split yoke base 48 will operate somewhat in the manner of a bell crank lever and the tendency for the arms 70 and horizontal base portion 60 to tilt as a unit in a clockwise direction as viewed in Fig. 9 will cause the clamping screw shank 64 to bind in base portion 60 and thus lock the screw in its tightened position. To still further enhance the locking function which is effected on the various yoke parts, the extreme rear edge of the lower portion 59 of the yoke base 48 is formed with a depending transverse rib 74 which, because of the tendency for the entire yoke assembly 50 to tilt in a counterclockwise direction as stated above, will bind against the land portion 38 and apply further tension to the various yoke parts.

It has been stated above that the various single or multi-head assemblies 56 which are capable of selective assembly in the present electricaly operated shaver are precision built and assembled at the factory. Certain of the dimensions involved in the construction of these assemblies and the proportioning of certain of the parts thereof are more or less critical and a description of these dimensional details will be left until a general understanding of the nature and operation of these assemblies, the manner in which they are electrically operated, and their association otherwise in the assembled shaver has been attained.

As best illustrated in Figs. 8, 8a and 9, the two-unit shaver head assembly 56 selected for illustration herein is generally cylindrical in its overall configuration and consists of two axially aligned cutting head units 58 of substantially identical construction and serially arranged or "sandwiched" between generally circular annular front and rear plates 80 and 82 respectively. An intermediate annular plate 84, likewise of circular design is interposed between the adjacent head units 58. The plates 80, 82 and 84 are each formed with a series of three radially extending clamping ears 86 in the peripheral regions thereof, the ears being spaced 90° apart with two of them being diametrically opposed on opposite sides of the assembly and with the third ear being positioned at the bottom thereof. Tie rod assemblies, each including a clamping bolt 88 having a slotted head 90 and the shank of which is threaded as at 92 to receive thereon a clamping nut 94, pass through the various aligned sets of ears 86 and, in combination with spacer collars 93, serve to maintain the various parts of the head assembly 56 in their operative assembled relationship.

Each cutting head unit 58 involves in its general organization a pair of opposed cup-shaped casings or shells 100 which are identical in size and design, each having an annular bottom wall 102 and laterally turned generally frusto-conical side walls 104 of relatively short slant height and the slant angle of which is relatively small. In the assembled cutting head unit, each bottom wall 102 constitutes a vertical end wall for the unit while the upstanding side wall 104 constitutes a portion of a circular and generally barrel-shaped horizontally extending outer wall for the unit. The medial region of each side wall 102 is formed with an inwardly offset portion 106 (see also Fig. 19) which creates an annular void or trough on the outer vertical face of the shell adapted to be filled with a bonding material 108 which may be in the form of a suitable cement and by means of which the vertical end wall of the shell may be bonded in face-to-face relationship to the adjacent plate 80, 82 or 84 as the case may be.

The longitudinal extent of the individual spacer collars 93 (Fig. 9) is such that the two shells 100 are maintained with their opposed rims 110 closely spaced from each other a predetermined distance, thus defining a narrow circular slot 112 between the sections. The shells 100 are preferably formed of spring steel of extremely thin gauge and, in the upper regions of the head 58, the opposed rim portions are ground or lapped to an extremely fine degree of thickness as indicated at 114 (Figs. 15 and 19) with the outer surfaces thereof extending in the same common plane. The rim portions in this upper region of the head 58 are slotted inwardly as at 115 to define a series of closely spaced oppositely facing teeth 116 with the teeth on adjacent shells 100 being staggered as shown in Fig. 14. The plates 80, 82 and 84, as well as the various end walls 102 of the shells 100, are each formed with central openings therein, all of such openings being designated at 118 and all of them being in axial alignment for passage therethrough of the drive shaft assembly for the various cutter elements, the nature of which will be set forth in detail subsequently.

Each cutter head 58 has associated therewith a pair of floating cutter elements 120 and 121 respectively (Figs. 9, 11 and 19), with the elements of each pair being similar in their configuration and differing only slightly in their details. Thus, a description of the cutter 120 will to a large extent serve for a description of the cutter 121. The cutter 120 is in the form of an elongated metal bar-like member which may be machined from crucible or other high grade steel and the medial region of which is enlarged as at 122 and provided with a non-circular and preferably rectangular opening 124 therethrough by means of which the cutter element may be mounted on a central driving hub 126 associated with the drive shaft assembly. Projecting radially outwardly in one direction from the enlargement 122 is a cutter arm 128 which carries at its outer or free end an integral cutter blade head 130. Projecting radially outwardly from the enlargement 122 in the opposite direction is a counter-balancing arm 132 having formed at its free end a semi-circular enlargement 134. The overall radial extent of the cutter arm 128 is somewhat greater than the overall extent of the counter-balancing arm 132. In the assembled cutter head, with the cutter element mounted on the central driving hub 126, the element is adapted to be rotated about the central axis of the hub in the forward direction indicated by the arrow in Figs. 11 and 20 so that the head continuously sweeps around the peripheral region of the cylindrical space defined by the opposed pair of cup-shaped shells 100. The cutter blade head 130 is in the form of an enlargement 136 at the free end of the arm 128 and from the trailing edge of which enlargement there extends forwardly and outwardly in the direction of rotation of the cutter element a cutter blade proper 138 having a forwardly disposed sharp leading cutting edge 140. The cutter blade proper 138 is carefully machined so as to present a predetermined polyhedral contour by means of which an extremely effective cutting action is attained when the shaver is in use and the specific details of the cutter blade will not be described at present but will be set forth fully at a later point in this specification when the operation of the shaver is outlined.

As best seen in Figs. 9 and 15, the cutter elements 120 and 121 are disposed in the head assembly 58 with the cutter element 120 being wholly contained and operating with the rearwardly facing shell 100 and with the cutter element 121 being wholly contained and operating within the adjacent and forwardly facing shell 100. The cutting elements 120 and 121 thus straddle the slot or void 112 existing between the two shells and they are maintained in a predetermined spaced relationship by means of spacer lugs or protuberances 142 formed on the element 120 and which slidingly engage the forward side surface of the element 121. The spacer lugs 142 serve to maintain the cutter elements 120 and 121 in exact parallelism and, since it is an axiomatic principle of geometry that three points in space define a plane, three of the lugs 142 of the same identical extent are provided on the element 120 and make contact with the side surface of the element 121 at three spaced points and one sufficient to maintain the desired parallelism between the cutter elements. As shown in Fig. 11, two of the lugs 142 are formed on the enlarged portion 136 of the cutter arm 128, while the third lug is formed on the enlargement 134 at the free end of the balancing arm 132. The protuberances 142 may be formed in the cutter element 120 by a suitable stamping operation utilizing male and female dies with the latter die being so designed that the protuberance emerges with a tapered end 144 presenting a restricted point 146 designed for contact with the forward side surface of the cutter element 121. No protuberances are formed on the cutter element 121 and thus the face of the latter is devoid of die depressions such as are shown at 148 in connection with the element 120 so that the three protuberances 142 may operate against a smooth planar surface on the element 121.

The driving connection between the motor armature shaft 25 and the cutter elements 120 and 121 is best seen in Figs. 2, 3 and 9 and consists of a power train including a set of gearing, the various gears of which are enclosed within a gear casing 150 of shallow cup-shape design secured by means of attachment screws 152 to the forward face of the closure and backing plate 34. The armature shaft 25 projects forwardly through the plate 34 and is rotatably journalled in bearings 154 provided in the plate 34 and casing 150 respectively and which are preferably of the non-lubricated porous bronze type. Rotatably disposed within the casing 150 and fixedly mounted on the shaft 25 is a gear 156 which meshes with an intermediate or idler gear 160 carried on a stub shaft 158, likewise mounted in bearings 154 in the plate 34 and casing 150. The idler gear 160, in turn, meshes with a third gear 162 mounted on a drive shaft 164 journalled in bearings 154 and which projects completely through the plate 34 and extends into the interior of the forward shell 100. The previously mentioned driving hub 126 is formed with a central bore 166 (Fig. 6) therein which communicates with an enlarged counter-bore 168 at the forward end of the hub. The drive shaft 164 projects rearwardly through the bearing 154 and plate 34 and extends loosely into the bore 166 in the hub 126 and is connected thereto in releasable driving relationship by means of cooperating pins 170 and 172 carried by the shaft and hub respectively. From the above description it will be seen that rotation of the armature shaft 25 in its normal direction of rotation, for example, in a counterclockwise direction as indicated by the arrow in Fig. 3, will transmit rotary motion through the gear or power train 156, 158, 162, to the drive shaft 164 which will be driven in the same direction as the armature shaft 25 so that the various cutter elements will be rotated in a counter-clockwise direction as indicated by the arrow in Fig. 11.

Referring now to Figs. 9 and 11, it will be observed that the rectangular opening 124 formed in the enlargement 122 of each cutter element 120 or 121 as the case may be is of substantially the same width as the width of the hub 126 in a transverse direction with respect to the element. The extent of the opening 124 in a longitudinal direction, however, is slightly greater than the width of the hub 126 in the same direction so that the cutter element is capable of limited sliding movement on the hub while at the same time it is constrained to follow the rotational movements of the hub. It has been stated previously that the length of the cutter arm 128 is slightly greater than the length of the balance arm 132. This fact, coupled with the fact that the combined mass of the cutter head 130 including the two protuberances 142 formed thereon is greater than the mass of the single protuberance on the free end of the balance arm 132, leaves a dynamically unbalanced mass on the cutting side of the cutter element so that upon rotation of the hub 126 and consequent rotation of the cutter element, the latter is biased under the influence of centrifugal force radially outwardly in the direction indicated by the radial arrow in Fig. 11 so that space or gap indicated at 174 in Figs. 9 and 11 between the hub 126 and one side wall of the rectangular opening 124 tends to become increased while the space or gap indicated at 176 on the opposite side of the hub 126 tends to become decreased whereby the cutter blade proper 138 is forced radially outwardly and into positive cooperating cutting contact with the circumferential row of cutting teeth 116 on the frusto-conical side walls 104 of the shell 100 with which the cutter blade is in radial alignment. By such an arrangement, compensation for wear of the cutter blade is automatically made.

The specific shape of the cutter blade proper 138 on each cutter element will be described in greater detail subsequently but for the present it is to be noted that the extreme outer surfaces 180 (Figs. 15 and 17) of the various cutter blades 138 conform in angularity to the angularity of the slant angle of the inner conical surface 182 of the outer walls 104 formed on the respective shells 100 with which these blades are associated. Thus, each cutter element 120 is formed with an outer surface 180 which is ground or lapped so as to be substantially complementary to the inner conical surface of the shell 100 with which it is associated and, accordingly, the surface is inclined generally upwardly and to the right as viewed in Fig. 15. By the same token, each cutter element 121 is formed with an outer surface 180 which is inclined upwardly and to the left as viewed in this figure. From the above description it will be observed that since the adjacent cutter elements 120 and 121 of each cutter head unit 58 are longitudinally slidable on the central driving hub 126, and since they are both urged radially outwardly under the influence of centrifugal force during operation of the shaver, the consequent camming action existing between the two mating surfaces 180 and 182 will cause the two cutters to be urged toward each other to bring the end 146 of the various protuberances 142 formed on the cutter element 120 into engagement with the opposed surface of the cutter element 121 so that as the two cutter elements 120 and 121 rotate in unison, they will, because of the floating relationship just described, automatically become longitudinally centered within the cutting head assembly 58. Furthermore, because of the fact that the three contact points or regions of contact between the protuberances 142 on the cutter element 120 and the side surface of the cutter element 121 establish a fixed plane for the cutter element 120 relative to the cutter element 121, the two elements are maintained in parallelism at all times during the operation of the shaver and any irregularities in the path of rotary movement of either cutter element, occasioned, for example, by the presence of foreign material in the head 58, or by thermal expansion of the parts, will be distributed between the two cutter elements to minimize any lack of register between the opposed cutting surfaces on the cutter teeth 116 and the cutting edges of the cutter elements.

Referring now the Figs. 1, 8 and 9, the rearmost plate 82 in the saver head assembly 56 is formed with a series of circumferentially spaced openings 190 therein through which the severed hair or so-called "cutter dust" may be expelled from the interior of the head assembly. In order to collect such shaving residue, a receptacle 192 is affixed to the outer face of the plate 82 and provides an internal chamber 194 in which the severed material may be collected. The receptacle is comprised of a cylindrical casing shell 196 having a radial flange 198 formed thereon and which is welded to the outer face of the plate 82 so that the same encompasses the various openings 190. The shell 196 is adapted to be closed by means of a cup-shaped cover member 200 which frictionally fits over the shell 196 and is provided with a circular fine-mesh screen 202 in the end wall thereof, the screen being held in position by a suitable internal bezel ring 204. In order to create a partial vacuum within the shaver head assembly 56, a rotary fan unit 206 including a fan hub 208 and radially extending fan blades 210 is mounted on the projecting end of a shaft 212 which passes through a bearing member 214 centrally mounted on the plate 82 and which has its forward end pressed into the bore 166 formed in the driving hub 126. A set screw 216 threadedly received in the hub 208 maintains the fan assembly or unit 206 properly positioned on the shaft 212. The partial vacuum created within the shaver head assembly 56 by the fan unit 206 serves to draw the cutter residue through the openings 190 and deposit the same within the chamber 194 from whence they may be removed from time to time by removal of the cover member 200.

The efficient operation of the present electric shaver is predicated to a large extent upon the specific shape or design of the cutter blade proper 138. The details of the blade appear in Figs. 16, 17 and 18 while the cutting action of the various blades in combination with the adjacent cutting teeth 116 with which they cooperate is illustrated in Figs. 14 and 15. The circumferential extent of the row of teeth 116 on each shell 100 may vary but it has been found that an arcuate extent of approximately 110° will adequately accommodate the normal oscillatory sweep or the wrist of the user in applying the head assembly 56 to the face or other portion of the body. The width of the slot 112, i. e., the distance between the rim portions 110 of the opposed pairs of shells 100, when in the neighborhood of .015 inch, will afford ease of entry of the beard hairs into the slot for subsequent proper cutting cooperation with the various cutting teeth 116. The inclination of the conical shell sides from the horizontal, i. e., the slant angle thereof, may be on the order of 10°. The depth of the various teeth 116 and the distance existing between adjacent teeth is based upon the diameter of the average human hair which is approximately .007 inch so that a depth of .015 inch and a separation width of .010 inch will serve for ease of entry and complete entrapment of the projecting hairs within the interstices or slots 115. The thickness of the metal of the various shells 100 is based upon considerations of rigidity, durability and ease of fabrication, as well as upon the extent of recession of the skin and consequent protrusion of the hair when normal pressure is applied to the face or other part of the body by the shaving head. It has been found that when the shells 100 are constructed from spring steel of light gauge having a thickness of .003 inch so that when the end regions of the teeth 116 are flattened off as previously described and indicated at 114, an extremely close cutting action will be attained.

The cutter blade proper 138 as shown in Figs. 17, 18 and 20 is contained wholly within the general plane of the bar-like cutter element 120 and emerges from the enlarged portion 136 in the form of a forwardly and outwardly inclined rectilinear extension of the arm 128. The blade 138 is generally trapezoidal in transverse cross section and its angle of inclination with respect to a radial plane of the cutter element 120 or 121 as the case may be, is shown as being approximately 60° although considerable latitude in this respect is contemplated. The cutter blade 138 for the cutter element 120 is similar in its design and proportioning to the cutter blade 138 for the element 121 but the two blades are complementary with respect to the direction of slope of certain of the surfaces thereof and particularly with respect to the direction of slope of the cutting edges 140, one of which is designed for cooperation with the rearwardly and outwardly inclined surface 182 of the forward shell 100 and the other of which is designed for cooperation with the forwardly and outwardly inclined surface 182 of the rearmost shell 100. It is thought, however, that a detailed description of one cutting head 138 of each pair associated with any one of the individual cutting head assemblies 58 will suffice for the other cutting head.

The metal of the cutting blade 138 on the inwardly facing side thereof is relieved as at 220 (Figs. 15, 17 and 18) so that the trailing side 222 of the blade is somewhat thinner than the leading side 224 thereof. The actual cutting edge 140 on the leading side 224 of the blade is thus somewhat thicker than the trailing edge 226 as seen in Figs. 17 and 18. The extreme outer surface 180 of the cutter blade is lapped so as to have a convex conical face which is complementary to and accurately fits against the concave conical face 182 of the shell sides 104 and against the inner faces of the cutting teeth 116 at the rim of these sides 104 as the cutter blade 138 makes its unidirectional sweep around the periphery of the cutter head 58.

From the above description it will be seen that the trihedral pyramidal angle which is subtended by the three cutter sides 180, 224 and 220 (Fig. 17), the bilateral corner 140 of which constitutes the cutting edge and the apex or trilateral corner of which is designated at 228 is relatively acute and the above-mentioned surfaces are so machined that this apex point is needle-sharp so that it will effect certain cutting and hair confining functions which will be presently discussed herein.

Referring now to Figs. 14 and 19 wherein the cutting action of the cutter blades 138 and their cooperating cutting teeth 116 is diagrammatically portrayed, it will be seen that when the cutter head 58 is applied to the skin for hair cutting purposes with the coplanar surfaces 114 thereof flush with the skin surface and bearing thereagainst with a moderate degree of pressure, the group of protruding hairs which are encompassed by the confines of the slot 112 will project through the slot and extend into the interior of the hollow cutter head as defined by the two adjacent opposed complementary shells 100. Since the skin will be depressed at the spaced regions where the tips or free ends of the cutter teeth 116 engage the skin, the intervening regions of the skin will be drawn taut in drum-like fashion so that the hair pockets will become stretched and thus enlarged while at the same time the inward pressure brought to bear on this area of the skin will cause these hair pockets to recede behind the normal plane of the epidermis and expose a portion of the normally concealed root portions of the hair. As the shaver head is slid in either direction transversely of the latter, the thus protruding hairs will enter such interstices as may be aligned therewith on one side of the dividing slot 112 and thus move into the path of the adjacent cutting blade 138 as the same sweeps around the conical surface 182 and become severed below the normal skin line.

It is to be observed that because of the relatively sharp trihedral angle afforded by the three sides of the cutter blade which terminate in the sharp apex or point 228, any given hair stub such as the one shown in Fig. 14 and designated at $h$ which enters the void or slot 115 existing between adjacent teeth and moves an appreciable distance into the path of sweeping movement of the leading edge 140 will, by a camming action against the inclined advancing leading cutting edge be forcibly impelled inwardly of the slot 115 where the cutting edge may more effectively perform its severing or shearing action. Thus, unlike cutter blades which present their cutting edges tangentially to the surface of the hair, the latter will not be struck a glancing blow tending to eject the same from the tooth interstices and thus avoid the severing action. Where a hair such as the hair $h'$ moves only partially into the path of the cutting edge 140, the hair will be split by the advancing edge of the cutter and released thereby as indicated by the dotted line position of the blade so that there will be binding of the hair against the cutter head 138 or the cutting teeth 116.

In order to dynamically balance the various moving parts of the shaving head assembly 56 against the vibrational effect of unequally opposed rotating mass increments, the two cutter elements 120 and 121 of adjacent cutting units 58 are mounted on the central driving hub 126 in reverse positions of orientation as shown in Fig. 9. Thus, the two relatively massive cutter blade heads 130 at the outer ends of the arms 128 in one unit 58 are counterbalanced by the cutter blade heads 130 of the next adjacent unit 58 so that there will be no appreciable unbalanced moments of centrifugal force within the shaver head assembly 56. It will be understood, of course, that where an even number of cutter heads 58 greater than the two illustrated herein are employed, numerical balancing of the cutter elements 120 and 121 may be resorted to which is not necessarily alternate with respect to adjacent heads.

In compliance with Title 35, U. S. Code, Section 22, a preferred form of the invention has been shown in the drawings and described herein, but it should be distinctly understood that the invention is not to be limited to the specific disclosure made, and that the appended claims should be construed as broadly as the prior art will permit.

Having thus described the invention what I claim as new and desire to secure by Letters Patent is:

1. In an electrically operated shaver, a tubular motor casing including front and rear end walls closing said casing, an electric motor disposed within said casing and including an armature shaft projecting through said rear end wall, a pair of spaced longitudinally extending ribs on said casing exteriorly thereof and defining therebetween a T-shaped slot, a backing plate on said casing projecting radially outwardly beyond said slot at the forward end thereof, a cutter drive shaft projecting through said backing plate, a power train operatively connecting said armature and drive shaft, a cutter head including a shell formed with hair-receiving openings therein, a rotatable cutter having a cutting edge designed for cooperation with said openings to sever hairs extending through the latter, and a central driving hub having a central bore therein into which the forward end of said drive shaft extends, a clamping member having a T-shaped base member slidable in said slot toward and away from said backing plate and engageable with the cutter shell for releasably clamping the latter against the backing plate, means engageable with the motor casing for securing said clamping member in its clamping position, and a releasable driving connection between said hub and cutter drive shaft.

2. In an electrically operated shaver, in combination, a tubular motor casing including front and rear end walls closing the casing, an electric motor disposed within said casing and including an armature shaft journalled at its ends in said end walls, means on said casing exteriorly thereof providing a longitudinally extending guideway, a backing plate on said casing projecting radially outwardly beyond said guideway at the forward end thereof, a relatively shallow gear housing secured to the rear end of said casing and defining, in combination with said rear end wall and backing plate, a narrow gear compartment rearwardly of the motor casing and backing plate, a cutter drive shaft projecting through said backing plate radially outwardly of said guideway and extending rearwardly into said compartment and forwardly of the backing plate, a gear train within said gear housing connecting said armature shaft to said drive shaft in driving relationship, a cutter head including a shell formed with hair-receiving openings therein, a rotatable cutter having a cutting edge designed for cooperation with said openings to sever hairs extending through the latter, and a central driving hub having a central bore therein into which the forward end of said drive shaft extends, a clamping member slidable in said guideway toward and away from said backing plate and engageable with the cutter shell for releasably clamping the latter against said backing plate, means engageable with the motor casing for securing said clamping member in its clamping position, and a releasable driving connection between said hub and cutter drive shaft.

3. In an electrically operated shaver, the combination set forth in claim 2 wherein said releasable driving connection comprises a pin projecting radially outwardly from the outer surface of the drive shaft, and means on said hub within said bore providing an abutment engageable with the pin when the drive shaft is received with the bore.

4. In an electrically operated shaver, a tubular motor casing including front and rear end walls closing said casing, an electric motor disposed within said casing including an armature shaft projecting through said rear end wall, a pair of spaced longitudinally extending ribs on said casing exteriorly thereof and defining therebetween a guideway, a backing plate on said casing projecting radially outwardly beyond said slot at the forward end thereof, a cutter drive shaft projecting through said backing plate, a power train operatively connecting said armature and drive shafts, a cutter head including a shell formed with hair-receiving openings therein, a rotatable cutter having a cutting edge for cooperation with said openings to sever hairs extending through the latter, and a central driving hub having a central bore therein into which the forward end of said drive shaft extends, a clamping member slidable in said guideway toward and away from said backing plate and engageable with the cutter casing for releasably clamping the latter against the backing plate, a clamping screw extending through said clamping member and engageable with the motor casing for securing said clamping member in its clamping position, and means on said casing providing a cam surface designed for camming engagement with the free end of said clamping screw when the latter is tightened thereagainst for biasing the clamping member within the guideway in the direction of said clamping plate to bind the cutter shell firmly between the clamping member and backing plate.

5. In an electrically operated shaver, the combination set forth in claim 4 including means on the casing providing additional cam surfaces spaced rearwardly from said first mentioned cam surface for similarly biasing the clamping member within the guideway and for selective engagement with the free end of said clamping screw to accommodate disposition of cutter heads of different longitudinal extent between the clamping member and backing plate.

6. In an electrically operated shaver, in combination, a tubular motor casing including front and rear end walls closing the casing, an electric motor disposed within said casing and including an armature shaft projecting through said rear end wall, a pair of spaced longitudinally extending ribs on said casing exteriorly thereof, said ribs undercut in opposed relation to provide opposed channel-shaped grooves defining therebetween a longitudinally extending guideway, a backing plate on said casing projecting radially outwardly beyond said guideway at the forward end thereof, a cutter drive shaft projecting through said backing plate, a power train operatively connecting said armature and drive shafts, a cutter head including a shell formed with hair receiving openings therein, a rotatable cutter having a cutting edge for cooperation with said openings to sever hairs extending through the latter, and a central driving hub within said cutter head casing and having a central bore therein into which the forward end of said drive shaft extends, a clamping member having a base portion slidable in said guideway toward and away from said backing plate, said clamping member being engageable with the cutter shell for releasably clamping the latter against said backing plate, a clamping screw extending through said base portion in threaded engagement therewith and engageable at its free end with the outer surface of said tubular motor casing between said ribs for releasably securing said clamping member in its clamping position, and a releasable driving connection between said hub and cutter drive shaft.

7. In an electrically operated shaver, the combination set forth in claim 6 wherein said base portion of the clamping member is slotted medially thereof to provide inner and outer spaced leg portions, said clamping screw extending through both of said leg portions, and means on said casing providing a cam surface designed for camming engagement with the free end of said clamping screw when the latter is tightened thereagainst for biasing the clamping member within said guideway in the direction of said clamping plate to bind the cutter shell firmly between the clamping member and backing plate, said clamping member engaging the cutter casing at a point radially outwards of the base portion of the clamping member whereby tightening of said clamping screw will bias said outer leg portion into binding engagement with said clamping screw.

8. In an electrically operated shaver, in combination, a tubular motor casing including front and rear end walls closing the casing, an electric motor disposed within said casing and including an armature shaft projecting through said rear end wall, a pair of spaced longitudinally extending ribs on said casing exteriorly thereof and undercut in opposed relation to provide opposed channel-shaped grooves defining therebetween a longitudinally extending guideway, a backing plate on said casing projecting radially outwardly beyond said guideway at the forward end thereof, a cutter drive shaft projecting through said backing plate, a power train operatively connecting said armature and drive shafts, a cutter head including a shell formed with hair receiving openings therein, a rotatable cutter having a cutting edge for cooperation with said openings to sever hairs extending through the latter, and a central driving hub within said cutter head shell having a central bore therein into which the forward end of said drive shaft extends in driving relation, a clamping yoke having a pair of outwardly extending yoke arms for engagement with the rear end of said cutter shell at spaced points thereon and having a base portion slidable in said guideway toward and away from said backing plate, a clamping screw extending through said base portion in threaded engagement therewith and engageable at its free end with the outer surface of said motor casing between said ribs for releasably securing said clamping member in its clamping position with said yoke arms in engagement with the cutter shell, and a releasable driving connection between said hub and cutter drive shaft.

9. In an electrically operated shaver, the combination set forth in claim 8 wherein said cutter shell is generally circular in transverse cross-section and is provided with an annular front wall engageable with said backing plate and an annular rear wall, said yoke arms at their outer ends bearing against said annular rear wall at diametrically opposed spaced points thereon.

10. In an electrically operated shaver, the combination set forth in claim 8 including, additionally, plural cam means on said casing providing a series of longitudinally spaced cam surfaces designed for selective camming engagement with said free end of said clamping screw to accommodate disposition of cutter heads of different longitudinal extent between the clamping member and backing plate.

11. In an electrically operated shaver, a motor casing, a removable cutter head including a cutter head unit mounted on said motor casing and including a pair of aligned cup-shaped shells having open rims disposed in spaced opposed relationship and defining therebetween a continuous circular slot, means for fixedly maintaining said shells in their spaced relationship, opposed limited arcuate regions of said rims having collectively opposed longitudinally spaced circumferentially spaced cutting teeth, a rotatable cutter element disposed within each shell and having a cutting edge cooperating with the cutting teeth of its respective shell, a common axially extending hollow driving hub for said cutter elements and on which the latter are mounted, a motor having a drive shaft in said motor casing, a cutter drive shaft removably and telescopically received within said driving hub and coupled thereto in driving relationship, and a power train operatively connecting the motor and cutter drive shafts in driving relationship.

12. In an electrically operated shaver, a motor casing, a removable cutter head including a cutter head unit mounted on said motor casing and including a pair of aligned cup-shaped shells having opposed spaced open rims defining therebetween a continuous circular slot, means for fixedly maintaining said shells in their spaced relationship, opposed limited arcuate regions of said rims having collectively opposed longitudinally extending circumferentially spaced cutting teeth, a rotatable cutter element disposed within each shell and having a cutting edge cooperating with the cutting teeth on its respective shell, a common axially extending hollow driving hub for said cutter elements and on which the latter are mounted, a motor having a drive shaft in said motor casing, a cutter drive shaft removably and telescopically received within said hub and coupled thereto in driving relationship, a gear train operatively connecting the motor and cutter drive shafts exteriorly of said motor casing and cup-shaped shells, and a cover for said gear train secured to said motor casing.

13. In an electrically operated shaver, in combination, a motor casing, a removable cutter head including a cutter head unit mounted on said casing and including a pair of aligned cup-shaped shells having opposed spaced open rims defining therebetween a continuous circular slot, means for fixedly maintaining said shells in their spaced relationship, opposed limited arcuate regions of said rims having collectively opposed longitudinally spaced circumferentially spaced cutting teeth, a rotatable cutter element disposed within each shell and having a cutting edge cooperating with the cutting teeth on its respective shell, a common axially extending driving hub for said cutter elements disposed within said shells and substantially coextensive with the longitudinal extent of the cutter head unit and on which said cutter elements are mounted, a motor having a drive shaft in said motor casing, a cutter drive shaft removably coupled to said hub in driving relationship, a gear train operatively connecting the motor and cutter drive shafts exteriorly of the motor casing and cup-shaped shells, and a cover for said gear train secured to the motor casing.

14. In an electrically operated shaver, the combination set forth in claim 13 wherein said cutter elements are each formed with a slot therein through which said hub loosely extends, said hub formed with parallel surfaces on its opposite sides slidingly engaging the sides of said slots in the cutter elements whereby the cutter elements are driven from the hub.

15. In an electrically operated shaver, in combination, a motor casing, a removable cutter head including a cutter head unit mounted on said casing and including a pair of aligned cup-shaped shells having frusto-conical outer walls which converge outwardly and present opposed spaced open rims defining therebetween a continuous circular slot, means for fixedly maintaining said shells in their spaced relationship, opposed limited arcuate regions of said rims presenting collectively opposed longitudinally spaced circumferentially spaced cutting teeth, a rotatable cutter element disposed within each shell and having a cutting edge cooperating with the cutting teeth on its respective shell, a common axially extending driving hub for said cutter elements disposed shell and having a cutting edge cooperating with the longitudinal extent of the cutter head unit and on which said cutter elements are mounted in driven relation for limited individual sliding movements both radially and longitudinally of the hub, a motor having a drive shaft in said motor casing, a cutter drive shaft removably coupled to said hub in driving relationship, and means operatively connecting said drive shafts in driving relationship, and spacer means extending between said cutter elements and slidable against at least one of the elements for maintaining the elements spaced apart and within their respective shells in radial alignment with the cutting teeth thereon.

16. In an electrically operated shaver, in combination, a motor casing, a removable cutter head including a cutter head unit mounted on said casing and including a pair of aligned cup-shaped shells having frusto-conical outer walls which converge outwardly and present opposed spaced open rims defining therebetween a continuous circular slot, means for fixedly maintaining said shells in their spaced relationship, opposed limited arcuate regions of said rims formed with longitudinally spaced circumferentially spaced cutting teeth with the teeth on said rims being collectively opposed, a rotatable cutter element disposed within each shell and having a cutting edge cooperating with the cutting teeth on its respective shell, a common axially extending driving hub for said cutter elements disposed within said shells and substantially coextensive with the longitudinal extent of the cutter head unit, said hub comprising an elongated bar which is rectangular in cross section, said cutter elements each having an elongated slot therein through which said hub extends with the sides of said slots slidingly engaging opposed sides on the hub whereby the cutter elements are, in effect, radially extensible on the hub as well as longitudinally slidable thereon, the overall width of said cutter elements being such that upon camming engagement of the cutting elements with the frusto-conical walls of their respective shells the elements will be urged into sliding engagement with each other to align the cutting edges thereon radially with their respective cutting teeth.

17. In an electrically operated shaver, the combination set forth in claim 16 including, additionally, three protuberances formed on one side of said cutter elements and slidingly engageable with the adjacent side of the other cutter element for maintaining said cutting edges of the two elements spaced apart and in radial alignment with the respective cutting teeth on the respective shells with which they cooperate.

18. In an electrically operated shaver, the combination set forth in claim 16 including, additionally, three protuberances formed on the rearwardly facing side of the forward cutter element and slidingly engageable with the forwardly facing side of the rear cutter element along limited regions of contact for maintaining said cutting edges of the two elements spaced apart and in radial alignment with the respective cutting teeth on the respective shells with which they operate.

19. In an electrically operated shaver, a cutter head unit comprising in combination a pair of cup-shaped shells each having a bottom wall and an outwardly inclined frusto-conical outer wall presenting a circular rim, means fixedly maintaining said shells in spaced relationship with their rims opposed to each other so as to define therebetween a circular hair-receiving slot, opposed limited arcuate regions of said rims having slots therein axially inwardly thereof to define a series of longitudinally extending cutting teeth, a rotatable cutter element disposed within each shell and having a cutting edge thereon cooperating with the cutting teeth on its respective shell, and a common axially extending driving hub for said cutter elements disposed within said shells and substantially coextensive with the longitudinal extent of the cutter head unit, said hub comprising an elongated bar having oppositely facing parallel sides, said cutter elements each having an elongated slot therein through which said hub extends with the sides of said slots slidingly engaging said opposite sides of the hub whereby the cutter elements are, in effect, radially extensible on the hub as well as being longitudinally slidable thereon, the overall width of said cutter elements being such that when the same are in mutual sliding contact, said cutting edges thereon will be radially aligned with the cutting teeth on the respective shells within which the cutter elements are rotatably mounted.

20. In an electrically operated shaver, a cutter head as claimed in claim 19 wherein each cutting element is formed with three intersecting surfaces defining therebetween a relatively acute trihedral angle, one of the three bilateral corners of which constitutes the cutting edge of the element, and the trilateral corner of which leads the remaining portions of the cutter element in the direction of rotation of the cutter element.

21. In an electrically operated shaver, in combination, a tubular motor casing, front and rear end walls closing the opposite ends of the casing respectively, an electric motor disposed within said casing and including an armature shaft projecting through said rear end wall, said rear end wall having an extension projecting radially outwardy beyond the casing and providing a backing plate exteriorly of the casing, a cutter drive shaft rotatably mounted on said backing plate, means on said casing exteriorly thereof providing a longitudinally extending guideway in circumferential alignment with said backing plate in the medial regions thereof and in substantial parallelism with the armature shaft, a cover plate secured to the rear side of said rear end wall and defining therewith a narrow gear compartment, a train of gears within said compartment operatively connecting the armature shaft and cutter drive shaft, a cutter head including a cutter shell and a cooperating cutter element rotatably mounted within the cutter shell, a central rotatable hub on which said cutter element is mounted and by means of which it is driven, a detachable driving connection between said cutter drive shaft and hub, and releasable clamping means for clamping said cutter head against the forward side of said backing plate with said drive shaft and hub operatively engaged through said detachable driving connection.

22. A cutter head for electrically operated shavers comprising in combination a pair of cup-shaped shells each having a bottom wall and an outer frusto-conical wall presenting a circular rim at the large base of the cone frustum, means fixedly maintaining said shells in spaced relationship with said rims opposed to each other so as to define therebetween a circular hair-receiving slot, opposed limited arcuate regions of said rims having slots therein axially inwardly thereof to define a series of longitudinally extending cutting teeth, a rotatable cutter element disposed within each shell and having a cutting edge thereon cooperating with the cutting teeth on its respective shell, a common axially extending driving hub for said cutter elements disposed axially within the shells and substantially coextensive with the longitudinal extent of the cutter head unit, and a lost motion connection between each cutter element and hub whereby the former is slidable both axially and radially on the latter, said cutter elements having an overall width such that when the same are in mutual sliding contact, said cutting edges will be in respective radial alignment with the cutting teeth on the respective shells within which the cutter elements are mounted.

23. A cutter head as claimed in claim 22 including, additionally, three spaced protuberances formed on one of said cutter elements, each of which makes point contact with a surface on the other cutter element to reduce the extent of frictional sliding engagement between said cutter elements.

24. A cutter head as claimed in claim 22 wherein the bottom wall of one of said shells is formed with a central opening therein, said driving hub having an extension projecting through said central opening and outwardly of the shell, means providing a series of air passages in said latter bottom wall, an air conduit secured to said latter bottom wall exteriorly of the shell and encompassing said passages, and a fan mounted on said hub extension within said air conduit.

25. A multi-unit cutter head assembly for electric shavers comprising in combination a plurality of cutter head units each of which is in the form of a relatively thin hollow casing of circular cross section and having front and rear radially extending end walls and a circumferential outer wall, a series of circumferentially spaced longitudinally extending cutting teeth formed on said outer wall, said cutter head units disposed in axial alignment with the rear wall of each unit opposing the front wall of the next adjacent unit, a dividing wall in the form of a substantially circular plate interposed between each pair of opposed front and rear walls, cutter means rotatably mounted within each casing for cooperation with said teeth, a common drive shaft assembly projecting axially through all of said casings and on which the various cutter means are mounted, front and rear circular end plates secured to the front wall of the foremost casing and to the rear wall of the rearmost casing respectively, each of said circular plates having portions thereof projecting radially outwardly of the confines of said casings, and combined tie rod and spacer means extending through said projecting portions of the plates radially outwardly of the casing confines for maintaining the plates in spaced parallel relationship.

26. A multi-unit cutter head assembly as claimed in claim 25, including, additionally, a bonding material interposed between the front and rear wall of each casing and its adjacent plate.

27. A multi-unit cutter head assembly as claimed in claim 25, including, additionally, an annular inwardly struck rib on each casing wall defining an annular groove exteriorly of the casing, and a bonding material substantially filling each groove whereby the wall is bonded to its adjacent plate in sealing relationship with respect thereto.

28. In an electrically operated shaver, a tubular motor casing including front and rear end walls closing the casing, an electric motor disposed within said casing and including an armature shaft projecting through said rear end wall, a pair of spaced longitudinally extending ribs on said casing exteriorly thereof, said ribs having opposed channel-shaped grooves defining therebetween a longitudinally extending guideway, a backing plate on said casing projecting radially outwardly beyond said guideway at the forward end thereof, a cutter drive shaft projecting through said backing plate, a power train operatively connecting said armature and drive shafts, a cutter head including a casing formed with hair receiving openings therein, a rotatable cutter having a cutting edge designed for cooperation with said openings to sever hairs extending through the latter, a central driving hub within said cutter head casing and having a central bore therein into which the forward end of said drive shaft extends, a circular retaining plate positioned against the rear end wall of said casing, a circular retaining plate positioned against the front end wall of said casing, a plurality of circumferentially spaced tie rods extending through said plates exteriorly of the casing, a spacer sleeve on each tie rod and extending between said retaining plates, a clamping yoke having a pair of outwardly extending yoke arms and a base portion slidable in said guideway toward and away from said backing plate, the outer ends of said yoke whereby said clamping yoke may be brought to bear thereagainst to clamp said casing and retaining plates bodily as a unit against said backing plate, a clamping screw extending through said base portion in threaded engagement therewith and engageable with the outer surface of said motor casing between said ribs for releasably securing said clamping member in clamping position, and a releasable driving connection between said hub and cutter drive shaft.

29. A cutter head for electrically operated shavers comprising in combination a pair of cup-shaped shells each having a bottom wall and an outer frusto-conical wall presenting a circular rim at the large base of the frustum, means fixedly maintaining said shells in spaced relationship with said rims opposed to each other so as to define therebetween a circular slot, opposed limited arcuate regions of said rims having a series of longitudinally extending cutting teeth, a rotatable cutter element disposed within each shell, each cutter element being in the form of an elongated flat bar having an enlargement at each end thereof, a cutter blade on one of said enlargements designed for cooperation with the cutting teeth on the shell within which the cutter blade is disposed, a common axially extending driving hub extending between the bottom walls of said shells, a lost motion connection between each cutter element and hub whereby the element is mounted on the hub at the medial regions thereof for limited sliding movement both axially and radially of the hub with the cutter elements disposed substantially in parallelism, two laterally spaced protuberances formed on one of said cutter element enlargements of one cutter element and a single protuberance formed on the other enlargement of said cutter element, all of said protuberances being slidingly engageable with a flat surface of the other cutter element for maintaining the elements in spaced relationship on said driving hub.

30. A cutter head for electrically operated shavers as claimed in claim 29 wherein said two protuberances are formed on the enlargement of said one cutter element from which the cutter blade extends.

31. A cutter head for electrically operated shavers as claimed in claim 29 wherein said protuberances are each in the form of pointed displacements of the material of the cutter element which make substantial point sliding contact with said flat surface on said other cutter element.

32. A cutter head for electrically operated shavers as claimed in claim 29 wherein the cutting teeth on said opposed rims are staggered circumferentially.

33. In an electrically operated shaver, a tubular motor casing including front and rear end walls closing said casing, an electric motor in said casing and including an armature shaft projecting through said rear end wall, a pair of longitudinally extending ribs on the casing exteriorly thereof and defining therebetween a T-shaped slot having opposed channel-shaped sides, said rear end wall extending radially outwardly beyond the casing confines to provide a backing plate at the rear end of said slot, a cutter drive shaft projecting through said backing plate, a power train operatively connecting said armature and drive shafts, a cutter head including a casing formed with hair-receiving openings therein, a rotatable cutter having a cutting edge designed for cooperation with said openings to sever hairs extending through the latter, and a central driving hub having a central bore therein into which the forward end of said drive shaft extends, and a clamping member having a base portion slidable in said guideway and engageable with the cutter head casing for clamping the latter in position against said backing plate, said base portion having a slot therein providing inner and outer leg portions, a clamping screw threadedly extending through both of said leg portions and engageable with said motor casing between said channel-shaped sides of the slot, for drawing the base portion against a wall of each of said channel-shaped sides, said clamping member engaging the cutter casing at a point radially outwardly of the base portion of the clamping member, a protuberance on said inner leg portion rearwardly of said clamping screw and engageable with the motor casing when said clamping screw is tightened, and a releasable driving connection between the hub and cutter drive shaft.

References Cited in the file of this patent

UNITED STATES PATENTS

| Number | Name | Date |
|---|---|---|
| 272,233 | Gates | Feb. 13, 1883 |
| 416,943 | McLean | Dec. 10, 1889 |
| 681,683 | Deck | Sept. 3, 1901 |
| 1,350,227 | Jones | Aug. 17, 1920 |
| 1,730,004 | Gregson | Oct. 1, 1929 |
| 2,178,976 | Te Pas | Nov. 7, 1939 |
| 2,201,951 | Brans | May 21, 1940 |
| 2,239,939 | Sneed | Apr. 29, 1941 |
| 2,292,931 | Dicke | Aug. 11, 1942 |
| 2,359,880 | Scully | Oct. 10, 1944 |
| 2,362,998 | Harshberger | Nov. 21, 1944 |
| 2,370,331 | Susunaga | Feb. 27, 1945 |
| 2,395,495 | Murphy | Feb. 26, 1946 |
| 2,619,720 | Rasmussen | Dec. 2, 1952 |
| 2,799,925 | Lattin | July 23, 1957 |

FOREIGN PATENTS

| 455,587 | Italy | Mar. 2, 1950 |